(12) United States Patent
Abotabl et al.

(10) Patent No.: US 12,550,146 B2
(45) Date of Patent: Feb. 10, 2026

(54) UPLINK CHANNEL REPETITIONS ACROSS DIFFERENT NETWORK POWER MODES

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Hung Dinh Ly, San Diego, CA (US); Yongjun Kwak, San Diego, CA (US)

( * ) Notice: Subject to any disclaimer, the term of this patent is extended or adjusted under 35 U.S.C. 154(b) by 891 days.

(21) Appl. No.: 17/670,141

(22) Filed: Feb. 11, 2022

(65) Prior Publication Data

US 2023/0262704 A1 Aug. 17, 2023

(51) Int. Cl.
*H04W 72/21* (2023.01)
*H04L 1/1867* (2023.01)
*H04W 52/02* (2009.01)
*H04W 72/23* (2023.01)

(52) U.S. Cl.
CPC .......... *H04W 72/21* (2023.01); *H04L 1/1887* (2013.01); *H04W 52/0274* (2013.01); *H04W 72/23* (2023.01)

(58) Field of Classification Search
None
See application file for complete search history.

(56) References Cited

U.S. PATENT DOCUMENTS

| | | |
|---|---|---|
| 2018/0014251 A1 | 1/2018 | Sambhwani et al. |
| 2018/0034736 A1* | 2/2018 | Anchan ............... H04L 47/2433 |
| 2019/0281545 A1* | 9/2019 | Kim .................. H04W 52/0216 |
| 2020/0092818 A1* | 3/2020 | Jiang ................. H04W 52/0261 |
| 2020/0221446 A1* | 7/2020 | Nam ..................... H04W 72/21 |
| 2020/0267652 A1* | 8/2020 | Choi ..................... H04L 1/1819 |
| 2020/0337021 A1* | 10/2020 | Zhang ....................... H04L 1/08 |
| 2021/0013990 A1* | 1/2021 | Chen ......................... H04L 1/16 |
| 2021/0100004 A1 | 4/2021 | Yang et al. |
| 2022/0030605 A1* | 1/2022 | Hu ........................ H04L 5/0023 |
| 2022/0104053 A1* | 3/2022 | Ye ......................... H04W 24/10 |
| 2022/0417922 A1* | 12/2022 | Balakrishnan .... H04W 28/0226 |
| 2024/0389096 A1* | 11/2024 | Chen ..................... H04L 5/0055 |

FOREIGN PATENT DOCUMENTS

| | | |
|---|---|---|
| EP | 3621233 A1 | 3/2020 |
| WO | 2021012247 | 1/2021 |

OTHER PUBLICATIONS

International Search Report and Written Opinion—PCT/US2023/060770—ISA/EPO—May 12, 2023.

* cited by examiner

*Primary Examiner* — Nicholas Sloms

(57) ABSTRACT

A network can switch between different network power modes to control power consumption and/or performance A user equipment (UE) can be configured to perform uplink channel repetitions across different power modes of the network. In one aspect, the UE can transmit the uplink channel repetitions using different configurations across different power modes. In one aspect, the UE can drop the remaining uplink channel repetitions after switching power mode. In one aspect, the UE can change the number of uplink channel repetitions after switching power mode. In one aspect, the UE can change the redundancy version of the uplink channel repetitions after switching power mode.

30 Claims, 13 Drawing Sheets

UPLINK CHANNEL REPETITIONS ACROSS DIFFERENT NETWORK POWER MODES

TECHNICAL FIELD

The technology discussed below generally relates to wireless communication systems, and more particularly, to controlling uplink channel repetitions across different network power modes.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. In 5G NR, a user equipment (UE) can be configured to transmit uplink data and/or various types of control information to the network using repetitions to enhance the coverage of the uplink transmissions.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the present disclosure disclose various techniques for performing uplink channel repetitions across different network power modes. A network can switch between different network power modes to control power consumption and/or performance. In some aspects, when a UE is configured to perform uplink channel repetitions, the UE can adjust or change the uplink channel repetitions across different network power modes.

One aspect of the disclosure provides an apparatus for wireless communication. The apparatus includes a transceiver for wireless communication, a memory, and a processor coupled to the transceiver and the memory. The processor and the memory are configured to transmit, to a wireless network, one or more instances of uplink channel repetitions when the wireless network is in a first power mode. The processor and the memory are further configured to transmit one or more remaining instances of the uplink channel repetitions in response to the wireless network switching from the first power mode to a second power mode that is different from the first power mode.

Another aspect of the disclosure provides an apparatus for wireless communication. The apparatus includes a transceiver configured for wireless communication, a memory, and a processor coupled to the transceiver and the memory. The processor and the memory are configured to transmit, to a wireless network, one or more instances of uplink channel repetitions when the wireless network is in a first power mode. The processor and the memory are further configured to drop one or more remaining instances of the uplink channel repetitions in response to the wireless network switching from the first power mode to a second power mode that is different from the first power mode.

Another aspect of the disclosure provides a method of wireless communication at a user equipment (UE). The UE transmits, to a wireless network, one or more instances of uplink channel repetitions when the wireless network is in a first power mode. The UE further transmits one or more remaining instances of the uplink channel repetitions in response to the wireless network switching from the first power mode to a second power mode that is different from the first power mode.

Another aspect of the disclosure provides an apparatus for wireless communication. The apparatus includes a transceiver for wireless communication, a memory, and a processor coupled to the transceiver and the memory. The processor and the memory are configured to receive, from a user equipment (UE), one or more instances of uplink channel repetitions when the apparatus is in a first power mode. The processor and the memory are further configured to switch from the first power mode to a second power mode that is different from the first power mode. The processor and the memory are further configured to receive, from the UE, one or more remaining instances of the uplink channel repetitions after switching from the first power mode to the second power mode.

These and other aspects of the invention will become more fully understood upon a review of the detailed description, which follows. Other aspects, features, and implementations will become apparent to those of ordinary skill in the art, upon reviewing the following description of specific, examples in conjunction with the accompanying figures. While features may be discussed relative to certain implementations and figures below, all implementations can include one or more of the advantageous features discussed herein. In other words, while one or more implementations may be discussed as having certain advantageous features, one or more of such features may also be used in accordance with the various implementations discussed herein. In a similar fashion, while examples may be discussed below as device, system, or method implementations, it should be understood that such examples can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

While aspects and implementations are described in this application by the illustration to some examples, those skilled in the art will understand that additional implementations and use cases may come about in many different arrangements and scenarios. Innovations described herein may be implemented across many different platform types, devices, systems, shapes, sizes, and packaging arrangements. For example, implementations and/or uses may come about via integrated chips and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and UE), end-user devices, etc. of varying sizes, shapes, and constitution.

Aspects of the present disclosure disclose various techniques for performing uplink channel repetitions across different network power modes. A network can switch between different network power modes to control power consumption and/or performance. In some aspects, when a UE is configured to perform uplink channel repetitions, the UE can adjust the uplink channel repetitions across different network power modes.

Figure 1:
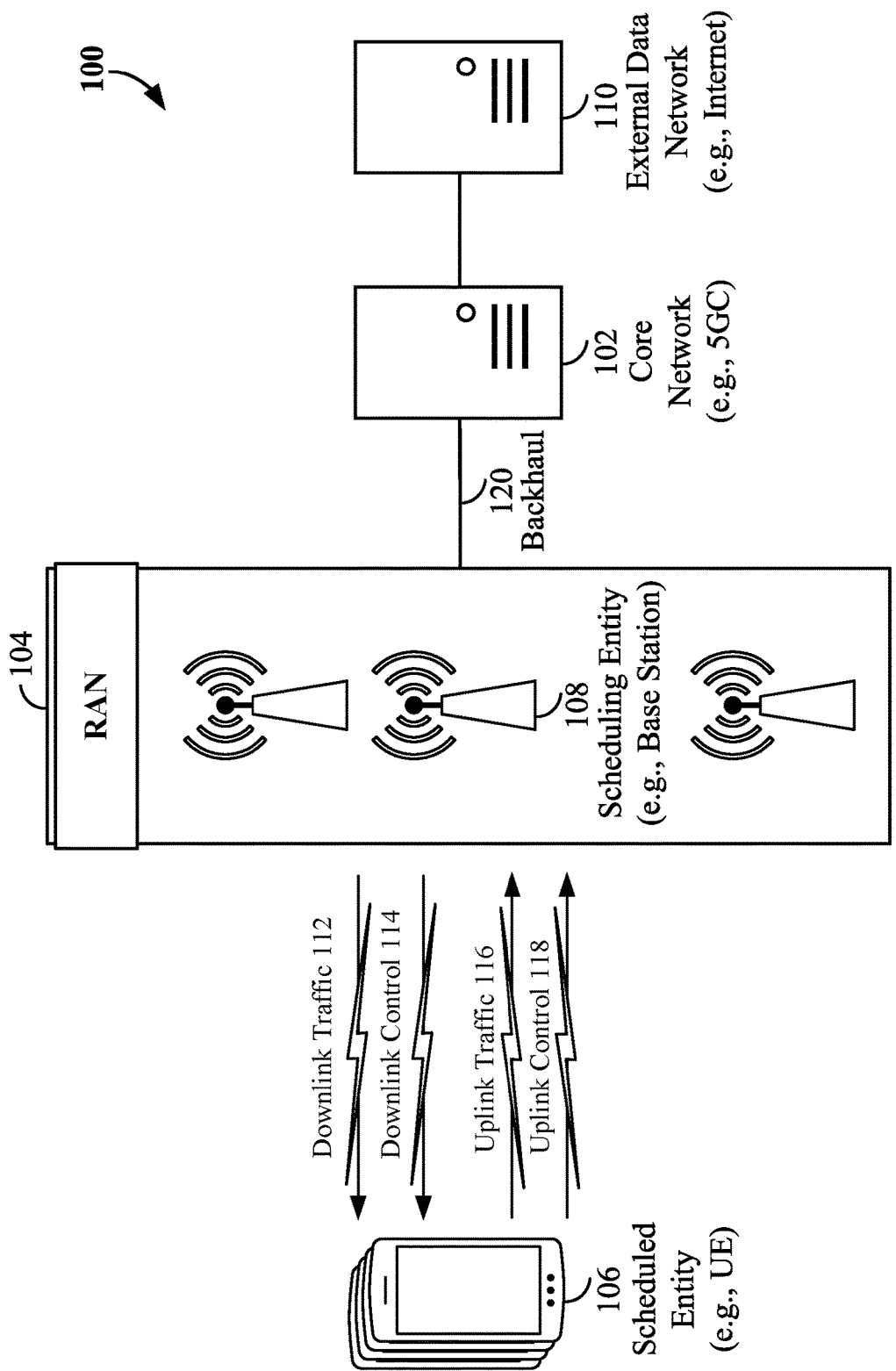
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smartphone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicles, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smartwatch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108. Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic information 112 and/or 116 may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
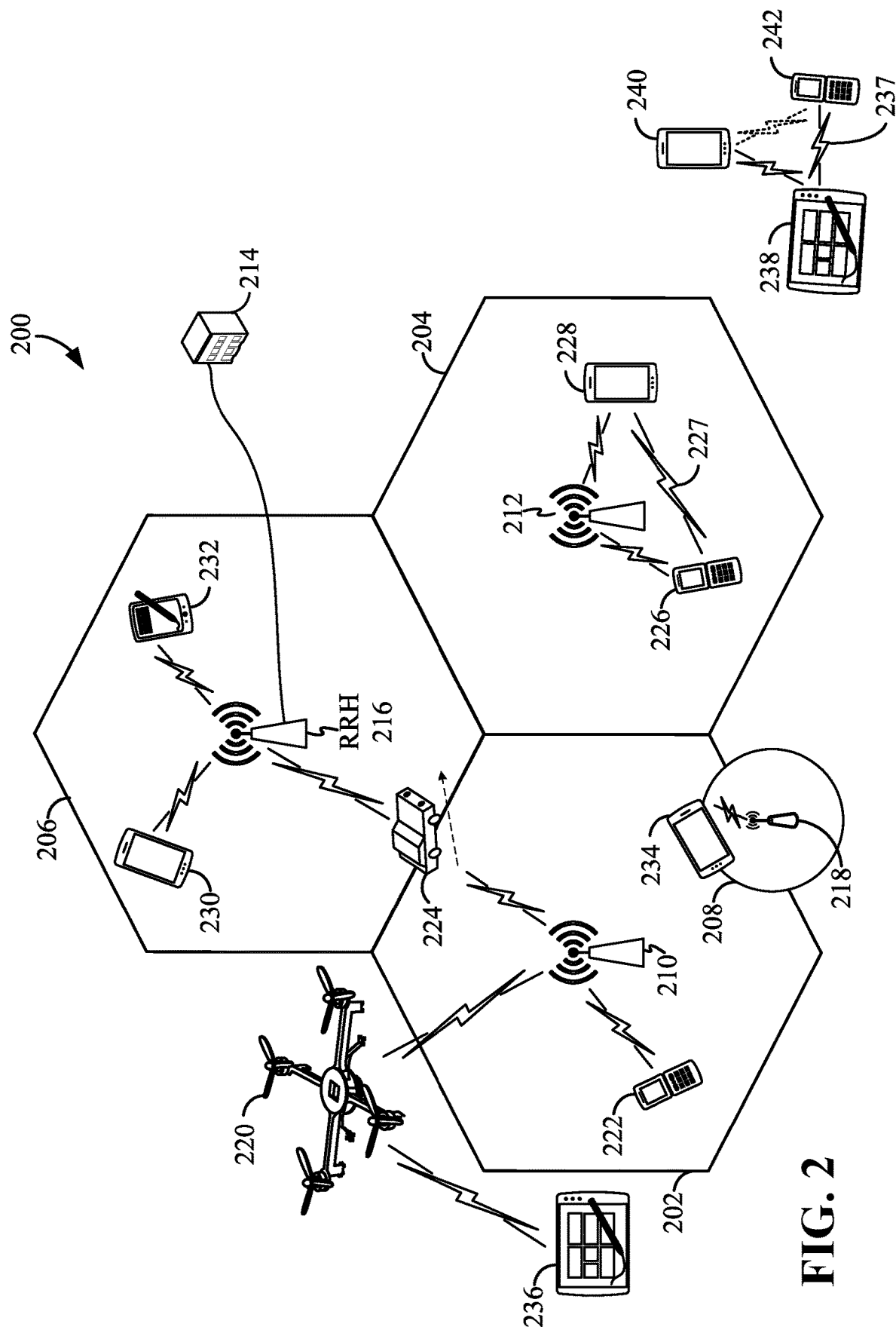
FIG. 2 is a schematic illustration of an exemplary radio access network (RAN) according to some aspects.

FIG. 2 is a conceptual illustration of an example of a radio access network (RAN) 200 according to some aspects. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a quadcopter or drone. The UAV 220 may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, the UAV 220 (e.g., quadcopter) may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink networks. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In some examples, a D2D relay framework may be included within a cellular network to facilitate relaying of communication to/from the base station 212 via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) and a security anchor function (SEAF) that perform authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if the signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs), and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may hand over the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next-generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for the exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the RAN 200 to obtain a low block error rate (BLER) while still achieving very high data rates, channel coding may be used. That is, wireless communication may generally utilize a suitable error-correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Aspects of the present disclosure may be implemented utilizing any suitable channel coding techniques. Various implementations of scheduling entities 108 and scheduled entities 106 may include suitable hardware and capabilities (e.g., an encoder, a decoder, and/or a CODEC) to utilize one or more of these channel codes for wireless communication. In 5G NR specifications, user data may be coded in various manners. For example, some data can be coded using quasi-cyclic low-density parity check (LDPC) with two different base graphs: one base graph is used for large code blocks and/or high code rates, while the other base graph is used otherwise. Control information and the physical broadcast channel (PBCH) can be coded using Polar coding, based on nested sequences. For these channels, puncturing, shortening, and repetition are used for rate matching.

The air interface in the RAN 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Further, the air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
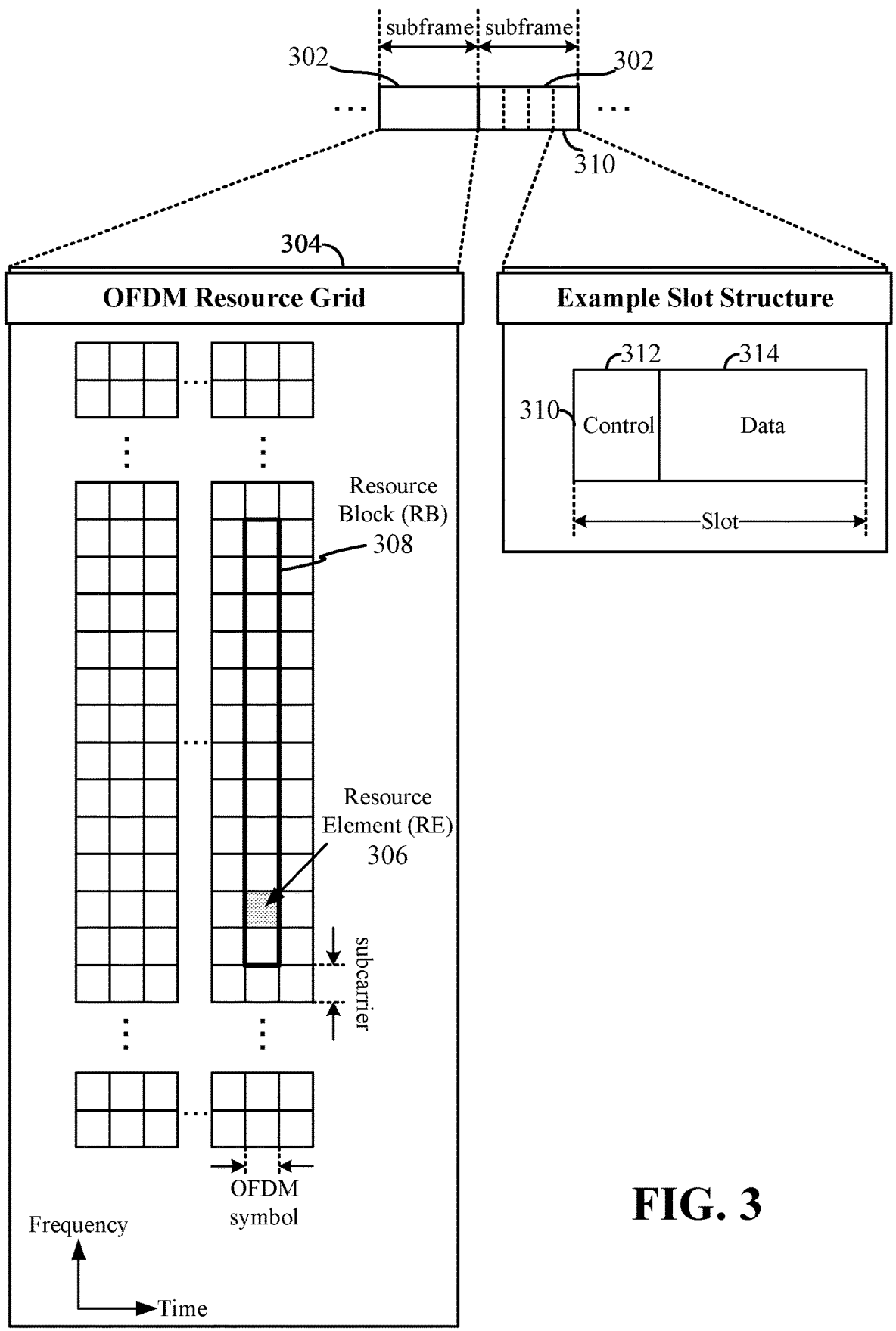
FIG. 3 is a schematic illustration of an organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the physical layer (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time—frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar devices) to other devices. Here, a broadcast communication is delivered to all devices, whereas a multicast or groupcast communication is delivered to multiple intended recipient devices. A unicast communication may refer to a point-to-point transmission by one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., a request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI. In some aspects, the UE can transmit control information using PUCCH repetitions.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above. In some aspects, the UE can transmit control information and/or data traffic using PUSCH repetitions.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Uplink Channel Repetitions

In some aspects, a UE can be configured to transmit UL data and/or control information using uplink channel repetitions. Repetitions of PUSCH and/or PUCCH can enhance the coverage of the uplink channel. For example, the same information in PUSCH/PUCCH can be repetitively transmitted over a plurality of time slots. A UE can be configured (e.g., configured by PUCCH-config using radio resource control (RRC) signaling) to repeat the PUCCH in a number of slots. Similarly, the UE can be configured (e.g., configured by PUSCH-config using RRC) to repeat the PUSCH in a number of slots. The UE can transmit an instance of the PUCCH/PUSCH of the configured repetitions in each scheduled slot.

A UE can transmit uplink data and/or control information using PUSCH and/or PUCCH. PUSCH transmission(s) can be dynamically scheduled by an UL grant in a DCI, or the transmission can correspond to a configured grant (e.g., Type 1 or Type 2 grant). PUSCH repetitions can include repetitions of a transport block for uplink transmission. The network (e.g., base station 108) can allocate one or more slots of resources for PUSCH repetitions. A UE can use a PUCCH transmission to transmit uplink control information (UCI) and/or a scheduling request (SR). For example, the UE can transmit UCI/SR in PUCCH resources allocated for UCI and/or SR. In some examples, the UE can be configured one or more slots for repetitions of a PUCCH transmission (i.e., PUCCH repetitions).

Figure 4:
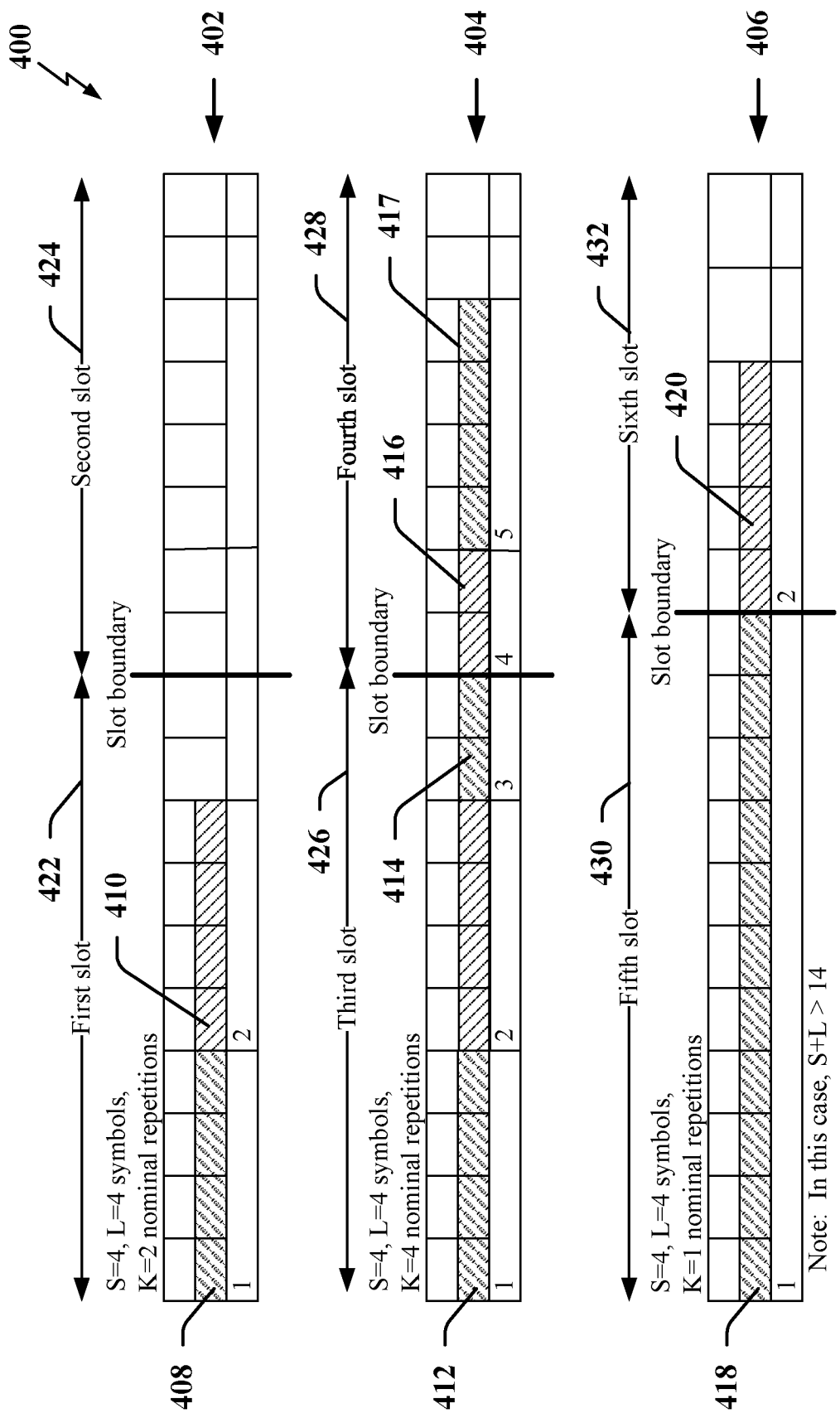
FIG. 4 is a schematic illustration of exemplary uplink channel repetitions according to some aspects.

FIG. 4 illustrates exemplary resource allocations 400 for PUCCH/PUSCH repetitions according to some aspects. FIG. 4 shows three exemplary repetition configurations: a first repetition configuration 402, a second repetition configuration 404, and a third repetition configuration 406. Each repetition configuration 402, 404, and 406 is illustrated with respect to two adjacent slots. For example, the first repetition configuration 402 is illustrated with respect to a first slot 422 and a second slot 424, the second repetition configuration 404 is illustrated with respect to a third slot 426 and a fourth slot 428, and the third repetition configuration 406 is illustrated with respect to a fifth slot 430 and a sixth slot 432.

The first repetition configuration 402 includes two repetitions, where a first repetition 408 has a length L of 4 symbols and a second repetition 410 has a length S of 4 symbols. Both repetitions 408 and 410 are transmitted in a single slot (e.g., the first slot 422). Thus, the first slot 422 has a quantity K of 2 repetitions. The second repetition configuration 404 has two repetitions of 4 symbols each (e.g., a first repetition 412). Due to a slot boundary between the third and fourth slots 426 and 428, the third slot 426 has a third repetition 414 of 2 symbols. The fourth slot 428 has a fourth repetition 416 of 2 symbols and a fifth repetition 417 of 4 symbols. In this case, an original third repetition of 4 symbols has been divided into two repetitions (the third repetition 414 and the fourth repetition 416) of 2 symbols each. The third repetition configuration 406 has one long repetition 418 of 14 symbols that fills up the fifth slot 430. The sixth slot 432 starts with a repetition 420 of 4 symbols. In this case, an original transmission of 14 symbols has been divided into two repetitions (the repetition 418 and the repetition 420) of 10 symbols and 4 symbols, respectively. Thus, because of slot boundaries, repetitions may be of different lengths.

With the introduction of 5G NR, network energy consumption can increase significantly relative to 4G systems. This energy consumption increase can impact the overall costs of operating a 5G network. In some aspects, a network can use different power modes (e.g., a nominal power mode and one or more power-saving modes) to control the energy consumption of the network. For example, the network can use various power-saving techniques in one or more power-saving modes to achieve the desired level of power consumption in different network conditions.

In a power-saving mode, a base station (e.g., gNB or scheduling entity) can enter a low-power mode (e.g., a sleep mode or mini-sleep mode) in which certain hardware (e.g., transceivers, power amplifier, RF chain, etc.) can be powered down or turned off to reduce power consumption. For example, the base station can periodically enter a mini-sleep mode when there is no pending data for transmission, and the base station can exit the mini-sleep mode when data is pending for transmission. In one aspect, the base station can use different antenna array configurations (e.g., numbers of active antennas) in different power modes. For example, since active antennas consume energy to operate, the base station can reduce its power consumption by using fewer active antennas or antenna units at the expense of less coverage. In one aspect, the base station can support different numbers of RATs in different power modes. Operating fewer RATs (e.g., LTE only) can reduce power consumption, for example, by turning off or disabling certain software and/or hardware at the base station to support fewer RAT(s). In one aspect, the base station can support different wireless bandwidths in different power modes. In general, it takes more energy to use a wider bandwidth for communication in comparison to a narrower bandwidth. For example, the base station can use a narrower bandwidth to reduce power consumption when the traffic in the network is below a certain threshold. In one aspect, the base station can support more or fewer cells or sectors in different power modes. For example, the base station can selectively power off certain network equipment for a cell/sector to reduce power consumption if needed. In one aspect, the base station can use different transmission power levels in different power modes. For example, the base station can use higher transmission power when the network has a higher traffic load and vice versa.

Figure 5:
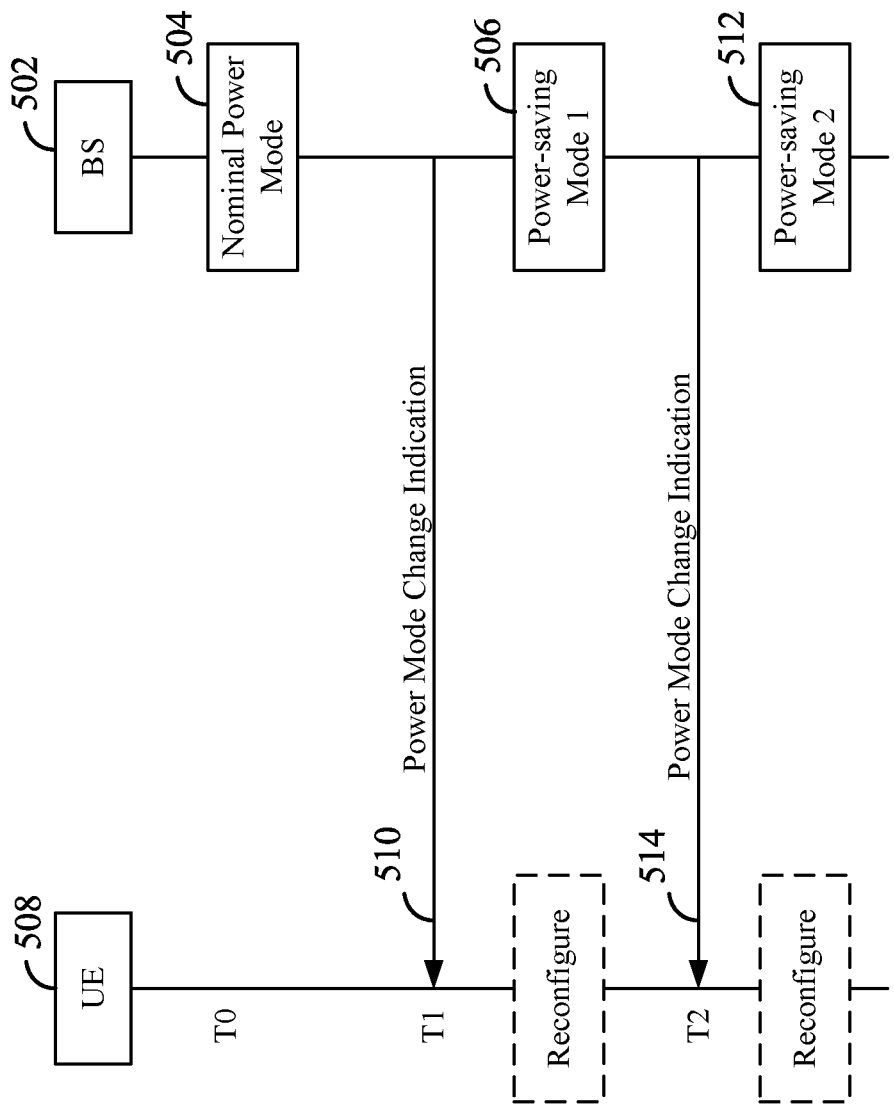
FIG. 5 is a diagram illustrating exemplary transitions between different network power modes according to some aspects.

FIG. 5 is a diagram illustrating exemplary transitions between different network power modes according to some aspects. Initially, at T0, a base station 502 (e.g., base station 108) may be in a nominal power mode 504 where no power-saving technique is used. At T1, the base station 502 can decide to switch to a different network power mode (e.g., power-saving mode 1 506) to reduce power consumption. The base station can inform a UE 508 (e.g., UE 106) about the power mode change using RRC, DCI, and/or MAC control element (CE), for example, using a power mode change indication 510. In one example, the base station 502 can change a communication bandwidth and/or an antenna configuration to reduce power consumption in the power-saving mode 1. At T2, the base station can inform the UE to switch to a second power-saving mode 512 (e.g., power-saving mode 2) that is different from the first power-saving mode 506 in one or more power-saving aspects, for example, sleep cycle, antenna configuration, bandwidth, supported RAT(s), transmission power, etc. For example, the base station can transmit a power mode change indication 514 to indicate the power mode change.

In response to the power mode changes, the UE can use different software and/or hardware configurations to communicate with the base station in different power modes. In some aspects, the UE can change an uplink channel repetition configuration (PUSCH or PUCCH repetition configuration) in response to network power mode changes.

Figure 6:
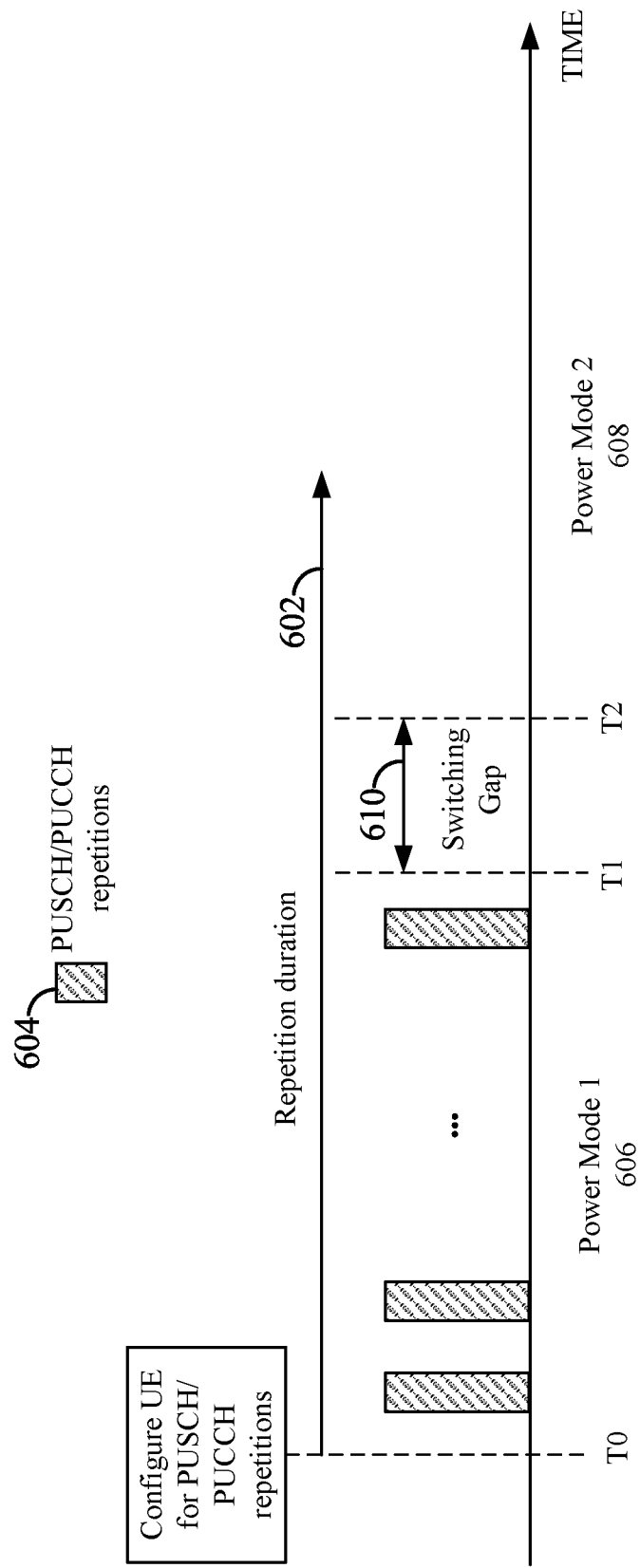
FIG. 6 is a diagram illustrating a first example of controlling uplink channel repetitions across different network power modes according to some aspects.

FIG. 6 is a diagram illustrating a first example of controlling uplink channel repetitions across different network power modes according to some aspects. At T0, a UE (e.g., UE 508) can be configured to transmit data and/or control information in an uplink channel (e.g., PUSCH or PUCCH) using repetitions. In some aspects, the duration 602 of the configured uplink repetitions can overlap different network power modes of the network. In one example, after the UE transmits one or more instances 604 of the uplink repetitions, a base station (e.g., base station 502) can switch from a first power mode 606 to a second power mode 608. The first power mode 606 and the second power mode 608 may be a nominal power mode or a power-saving mode. The base station may inform the UE about the power mode switching at T1 and complete the switching at T2. In some aspects, the base station can signal the UE about the power mode switching using RRC, DCI, and/or MAC CE signaling. In some aspects, the base station can complete the power mode switch in a switching time gap (e.g., time gap 610). In one aspect, the UE can transmit N instances of the total configured uplink repetitions (e.g., M repetitions) until the switching gap 610 and drop the remaining repetitions (e.g., M-N repetitions) after the power mode switch.

Figure 7:
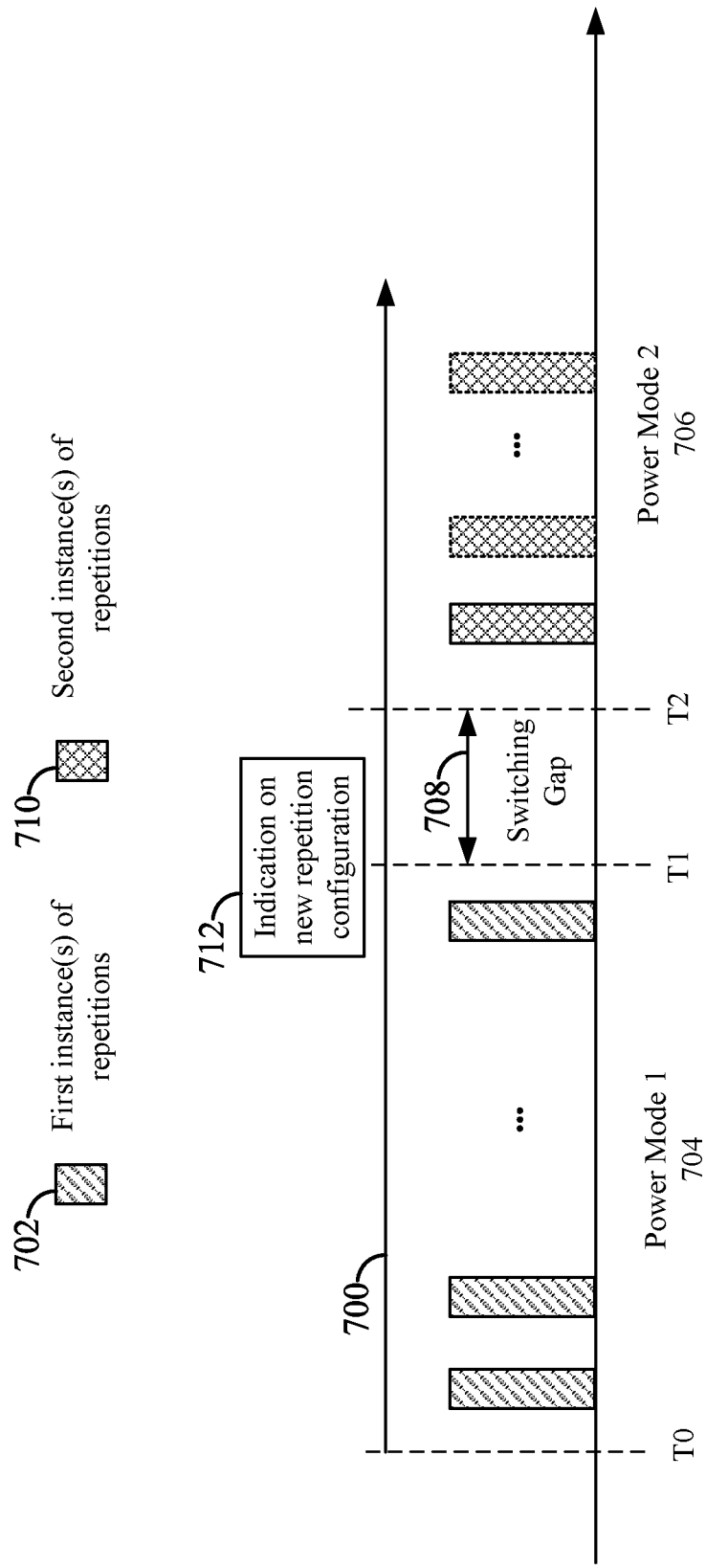
FIG. 7 is a diagram illustrating a second example of controlling uplink channel repetitions across different power modes according to some aspects.

FIG. 7 is a diagram illustrating a second example of controlling uplink channel repetitions across different network power modes according to some aspects. At T0, a UE (e.g., UE 508) can be configured to transmit data and/or control information in an uplink channel (e.g., PUSCH or PUCCH) using repetitions. In some aspects, the duration 700 of the uplink repetitions can overlap different network power modes of the network. In one example, after the UE transmits one or more first instances 702 of the repetitions, the base station (e.g., base station 502) can switch from a first power mode 704 to a second power mode 706. The first power mode 704 and the second power mode 706 can be a nominal power mode or a power-saving mode. In one aspect, the UE can transmit the one or more first instances 702 of the repetitions until the switching gap 708 and transmit the rest (e.g., one or more second instances 710) of the configured uplink channel repetitions as if there is no change in network power modes. For example, the UE can continue the uplink channel repetitions after the switching gap 708 without changing the configuration (e.g., number of repetitions and/or transmission power) of the repetitions.

In some aspects, after switching the power mode, the UE can transmit the rest of the repetitions using a repetition configuration specific to the current power mode configuration of the network. In one example, if the base station increases/decreases the number of antennas in use, the UE can decrease/increase its uplink transmission power, for example, to maintain the same level of uplink transmission coverage. The number of antennas (e.g., active antennas) used by the base station (e.g., base station 108) in each network power mode can be preconfigured, and the base station can configure or indicate to the UE (e.g., by RRC, DCI, and/or MAC CE) to use a predetermined number of repetitions for a corresponding power mode. In one example, when the base station uses four antenna panels (e.g., Rx panels), the UE can transmit four repetitions of an uplink transmission (e.g., PUSCH/PUCCH). In another example, when the base station uses one antenna panel, the UE can transmit twelve repetitions of the uplink transmission. In some aspects, the network can transmit a DCI and/or MAC CE to the UE to indicate a preconfigured (e.g., RRC configured) number of repetitions for a specific network power mode. For example, the base station can transmit a signal 712 (e.g., DCI or MAC CE) to the UE at T1 to indicate the new number of repetitions.

In some aspects, the UE can transmit the maximum number of repetitions configured across two different power modes. For example, the UE can be configured to transmit a first number of uplink repetitions in the first power mode 704 and a second number of uplink repetitions in the second power mode 706. In that case, when the UE is configured to transmit uplink repetitions that extend across different power modes (e.g., switching from the first power mode to second power mode), the UE can use the maximum of the first number of repetitions and the second number of repetitions for the uplink repetition across the power modes.

In some aspects, the UE can keep the same number of repetitions of the first power mode after switching to the second power mode. In that case, the UE does not change the uplink channel repetitions after switching power modes. In some aspects, the UE can adjust (e.g., increase/decrease) the number of repetitions according to various configured (e.g., RRC configured) criteria. In some aspects, the base station can provide the UE with a mapping between the number of repetitions used in different network power modes. For example, the mapping may indicate that one uplink channel (e.g., PUSCH/PUCCH) repetition or instance in the first power mode 704 can be equivalent to two repetitions in the second power mode 706. In that case, the UE adjusts the number of configured repetitions according to the network power mode. In one example, the UE can be configured to transmit eight repetitions. If only six repetitions have been transmitted in the first power mode 704, two remaining repetitions need to be transmitted. Due to the power mode switching, however, the remaining two repetitions are transmitted as four repetitions to meet the configured mapping.

Figure 8:
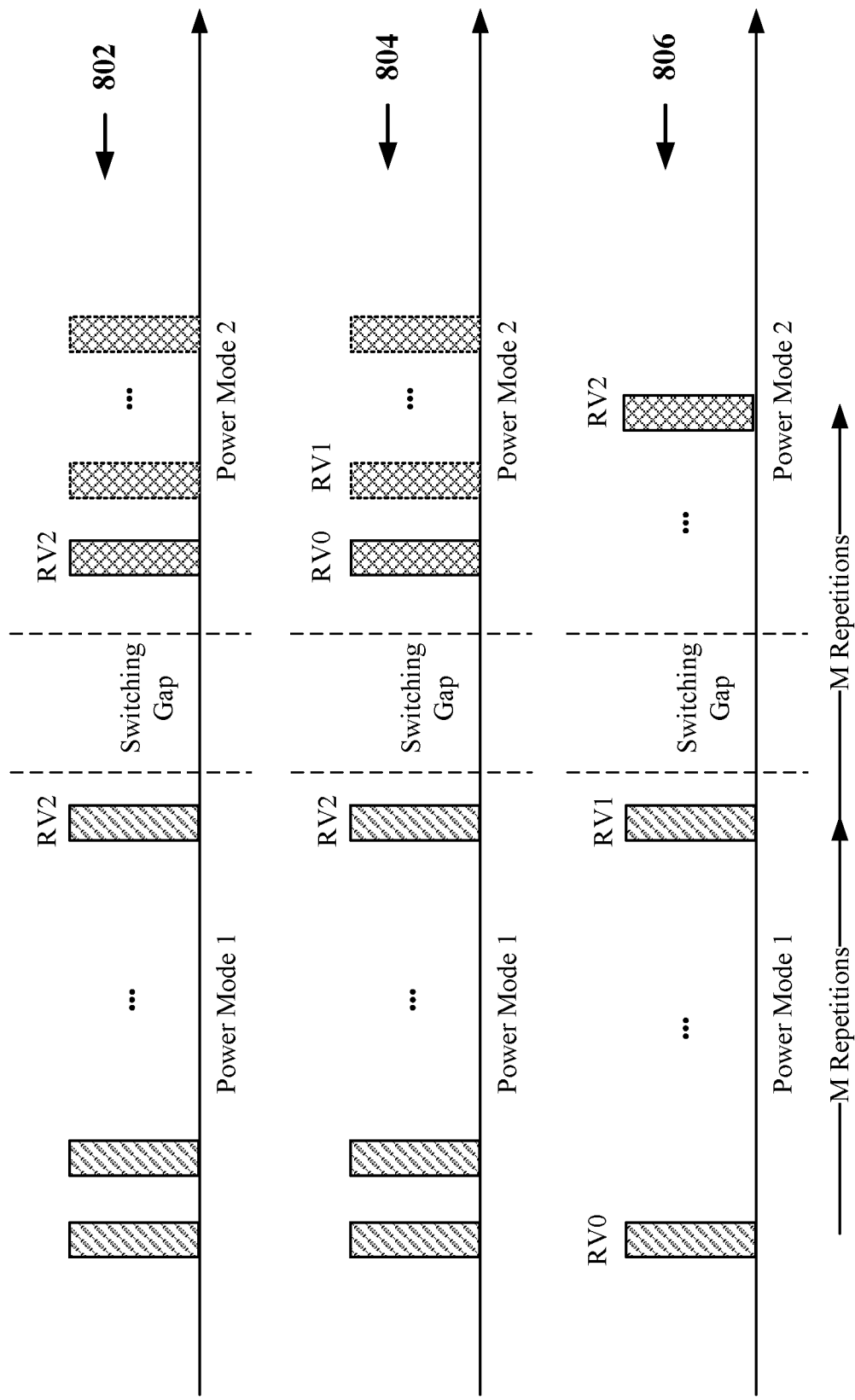
FIG. 8 is a diagram illustrating examples of controlling redundancy versions of uplink repetitions across different network power modes according to some aspects.

In 5G NR, HARQ operation and the corresponding rate matching operation can be controlled using redundancy versions (RVs) (e.g., RV0 to RV3). The selected RV for a retransmission indicates the amount of redundancy added into the codeword while encoding. In some aspects, the UE may or may not change the redundancy version of the uplink repetitions across different network power modes, for example, based on an RRC configuration. FIG. 8 is a diagram illustrating examples of controlling RVs of uplink repetitions across different network power modes according to some aspects. Ina first repetition configuration 802, the UE does not increment the RV once switched to a different network power mode. For example, the UE maintains the redundancy version (e.g., RV2) for uplink repetition when switching from a first network power mode to a second network power mode). In a second repetition configuration 804, the UE can reset (e.g., set to RV0) the RV once switched from a first network power mode to a second network power mode and increments the RV accordingly during repetitions of an uplink signal (e.g., UCI/HARQ feedback). In one aspect, the UE may not increment the RV of the first repetition instance once switched to a different network power mode, but may increment the rest of the repetitions. In a third repetition configuration 806, the UE may be configured to increment the RV for every M repetitions in a network power mode or across different network power modes.

Figure 9:
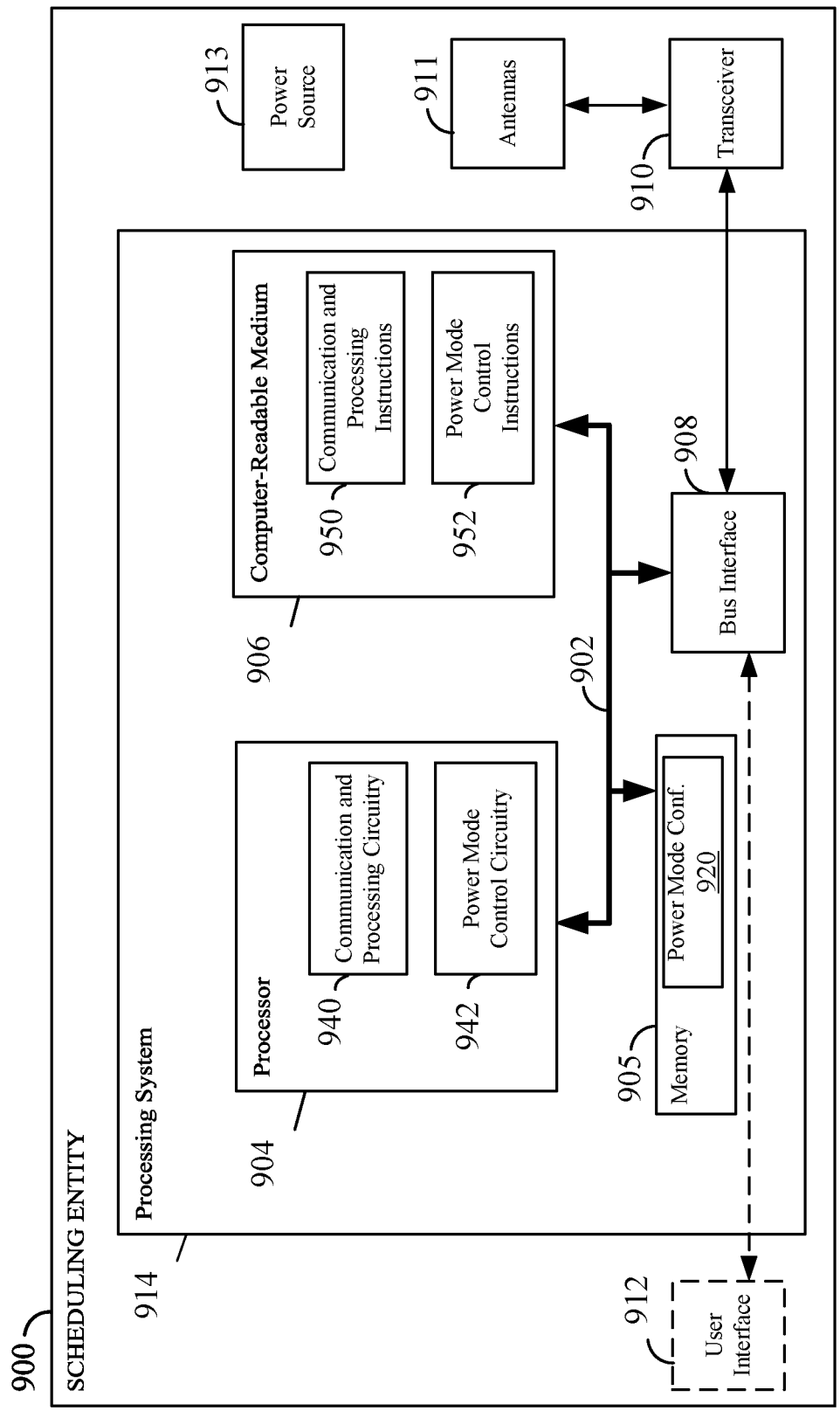
FIG. 9 is a block diagram illustrating an example of a hardware implementation for a scheduling entity according to some aspects.

FIG. 9 is a block diagram illustrating an example of a hardware implementation for a scheduling entity 900 employing a processing system 914. For example, the scheduling entity 900 may be a base station (e.g., gNB) as illustrated in any one or more of FIGS. 1, 2, and/or 5.

The scheduling entity 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 900 may be configured to perform any one or more of the functions and processes described herein. That is, the processor 904, as utilized in a scheduling entity 900, may be used to implement any one or more of the processes and procedures described and illustrated in FIGS. 5-8 and 10.

The processor 904 may in some instances be implemented via a baseband or modem chip and in other implementations, the processor 904 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a communication interface or means for communicating with various other apparatus over a transmission medium. For example, the transceiver 910 can be connected to one or more antennas 911 (e.g., active antennas) for receiving and transmitting wireless signals. A power source 913 can support power to the transceiver 910 and/or antennas 911. Depending upon the nature of the apparatus, a user interface 912 (e.g., keypad, display, speaker, microphone, joystick) may also be provided. Of course, such a user interface 912 is optional, and may be omitted in some examples, such as a base station.

The processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data (e.g., one or more power mode configurations 920) that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 904 may include circuitry configured for various functions, including, for example, uplink channel repetition control. For example, the circuitry may be configured to implement one or more of the functions described in relation to FIGS. 5-8 and 10.

In some aspects of the disclosure, the processor 904 may include communication and processing circuitry 940 configured for various functions, including for example communicating with a network core (e.g., a 5G core network), scheduled entities (e.g., UE), or any other entity, such as, for example, local infrastructure or an entity communicating with the scheduling entity 900 via the Internet, such as a network provider. In some examples, the communication and processing circuitry 940 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 940 may include one or more transmit/receive chains. In addition, the communication and processing circuitry 940 may be configured to receive and process uplink traffic and uplink control messages (e.g., similar to uplink traffic 116 and uplink control 118 of FIG. 1), transmit and process downlink traffic and downlink control messages (e.g., similar to downlink traffic 112 and downlink control 114). The communication and processing circuitry 940 may further be configured to execute communication and processing software 950 stored on the computer-readable medium 906 to implement one or more functions described herein.

In some implementations where the communication involves receiving information, the communication and processing circuitry 940 may obtain information from a component of the scheduling entity 900 (e.g., from the transceiver 910 that receives the information via radio frequency signaling or some other type of signaling suitable for the applicable communication medium), process (e.g., decode) the information, and output the processed information. For example, the communication and processing circuitry 940 may output the information to another component of the processor 904, to the memory 905, or to the bus interface 908. In some examples, the communication and processing circuitry 940 may receive one or more of signals, messages, other information, or any combination thereof. In some examples, the communication and processing circuitry 940 may receive information via one or more channels. In some examples, the communication and processing circuitry 940 may include functionality for a means for receiving. In some examples, the communication and processing circuitry 940 may include functionality for a means for processing, including a means for demodulating, a means for decoding, etc.

In some implementations where the communication involves sending (e.g., transmitting) information, the communication and processing circuitry 940 may obtain information (e.g., from another component of the processor 904, the memory 905, or the bus interface 908), process (e.g., modulate, encode, etc.) the information, and output the processed information. For example, the communication and processing circuitry 940 may output the information to the transceiver 910 (e.g., that transmits the information via radio frequency signaling or some other type of signaling suitable for the applicable communication medium). In some examples, the communication and processing circuitry 940 may send one or more of signals, messages, other information, or any combination thereof. In some examples, the communication and processing circuitry 940 may send information via one or more channels. In some examples, the communication and processing circuitry 940 may include functionality for a means for sending (e.g., a means for transmitting). In some examples, the communication and processing circuitry 940 may include functionality for a means for generating, including a means for modulating, a means for encoding, etc.

In some aspects of the disclosure, the processor 904 may include power mode control circuitry 942 configured for various functions, for example, network power mode switching functions. In some aspects, the power mode control circuitry 942 can be configured to control various aspects of the scheduling entity 900 that can affect the power consumption. In one example, the power mode control circuitry 942 can be configured to control (e.g., enable and disable) the use of a sleep mode in different power modes. In one example, the power mode control circuitry 942 can be configured to control the number of antennas (e.g., active antennas 911) used in different power modes. In one example, the power mode control circuitry 942 can be configured to control the RAT(s) (e.g., NR and LTE) used in different power modes. In one example, the power mode control circuitry 942 can be configured to control the wireless bandwidth used in different power modes. In one example, the power mode control circuitry 942 can be configured to control the cells or sectors used (e.g., enabled or disabled) in different power modes. In one example, the power mode control circuitry 942 can be configured to control the transmission power (e.g., by controlling the power source 913) of the scheduling entity 900 in different power modes. The power mode control circuitry 942 may further be configured to execute power mode control software 952 stored on the computer-readable medium 906 to implement one or more functions described herein.

Figure 10:
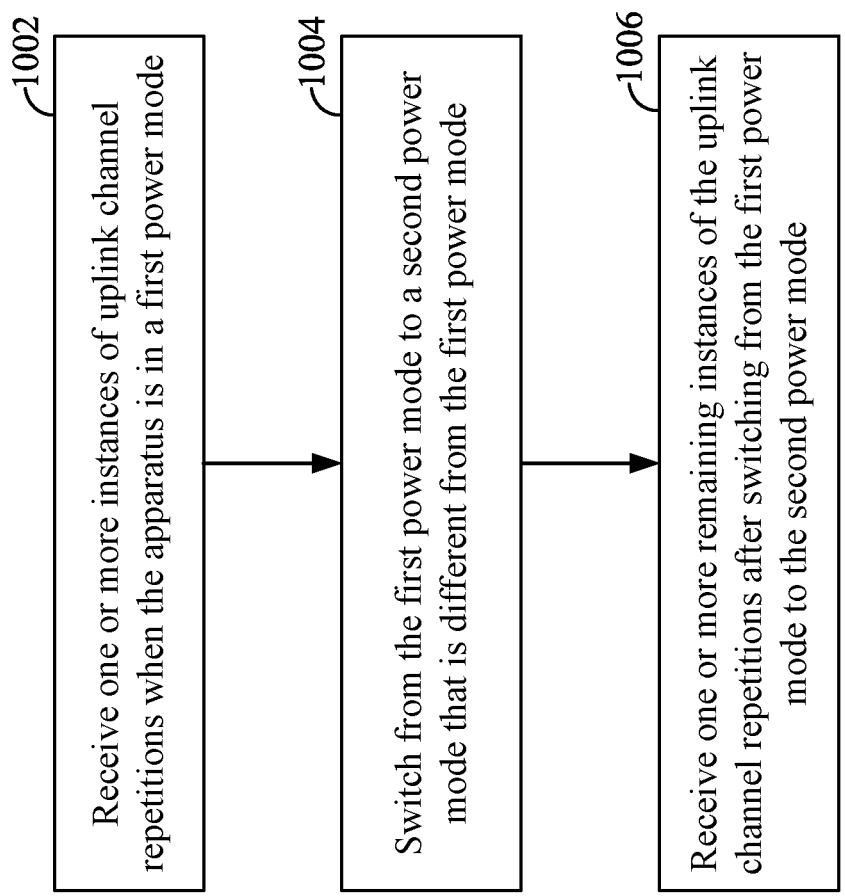
FIG. 10 is a flow chart illustrating an exemplary process for receiving uplink channel repetitions across different network power modes according to some aspects.

FIG. 10 is a flow chart illustrating an exemplary process 1000 for receiving uplink channel repetitions in different network power modes according to some aspects. As described below, some or all illustrated features may be omitted in a particular implementation within the scope of the present disclosure, and some illustrated features may not be required for all implementations. In some examples, the process 1000 may be carried out by the scheduling entity 900 illustrated in FIG. 9. In some examples, the process 1000 may be carried out by any suitable apparatus (e.g., a base station or gNB) or means for carrying out the functions or algorithm described below.

At block 1002, a base station can receive one or more instances of uplink channel repetitions when the base station is in a first power mode. In one example, the communication and processing circuitry 940 can provide a means to receive the one or more instances of uplink channel repetitions via the transceiver 910 and antennas 911. The one or more instances of uplink channel repetitions may include one or more PUSCH and/or PUCCH repetitions. The first power mode may be a nominal power mode or a first power saving mode described above in relation to FIGS. 5-8.

At block 1004, the base station can switch from the first power mode to a second power mode that is different from the first power mode. For example, the first power mode and the second power mode may be different in one or more aspects, for example, power saving and/or transmission power. In one example, the power mode control circuitry 942 can provide a means to switch the power mode of the base station based on a power mode configuration 920. In some aspects, the second power mode may have a different configuration than the first power mode in terms of, for example, antenna and/or sleep mode configurations.

At block 1006, the base station can receive one or more remaining instances of the uplink channel repetitions after switching from the first power mode to the second power mode. In one example, the communication and processing circuitry 940 can provide a means to receive the one or more remaining instances of the uplink channel repetitions. In some aspects, the base station may not receive the remaining instances of the uplink channel repetitions. In that case, the UE may drop all remaining instances of the uplink channel repetitions after switching the power modes.

In one configuration, the apparatus 900 for wireless communication includes means for receiving uplink repetitions in different network power modes. In one aspect, the aforementioned means may be the processor 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1, 2, and/or 5, and utilizing, for example, the processes and/or algorithms described herein in relation to FIGS. 5-8 and/or 10.

Figure 11:
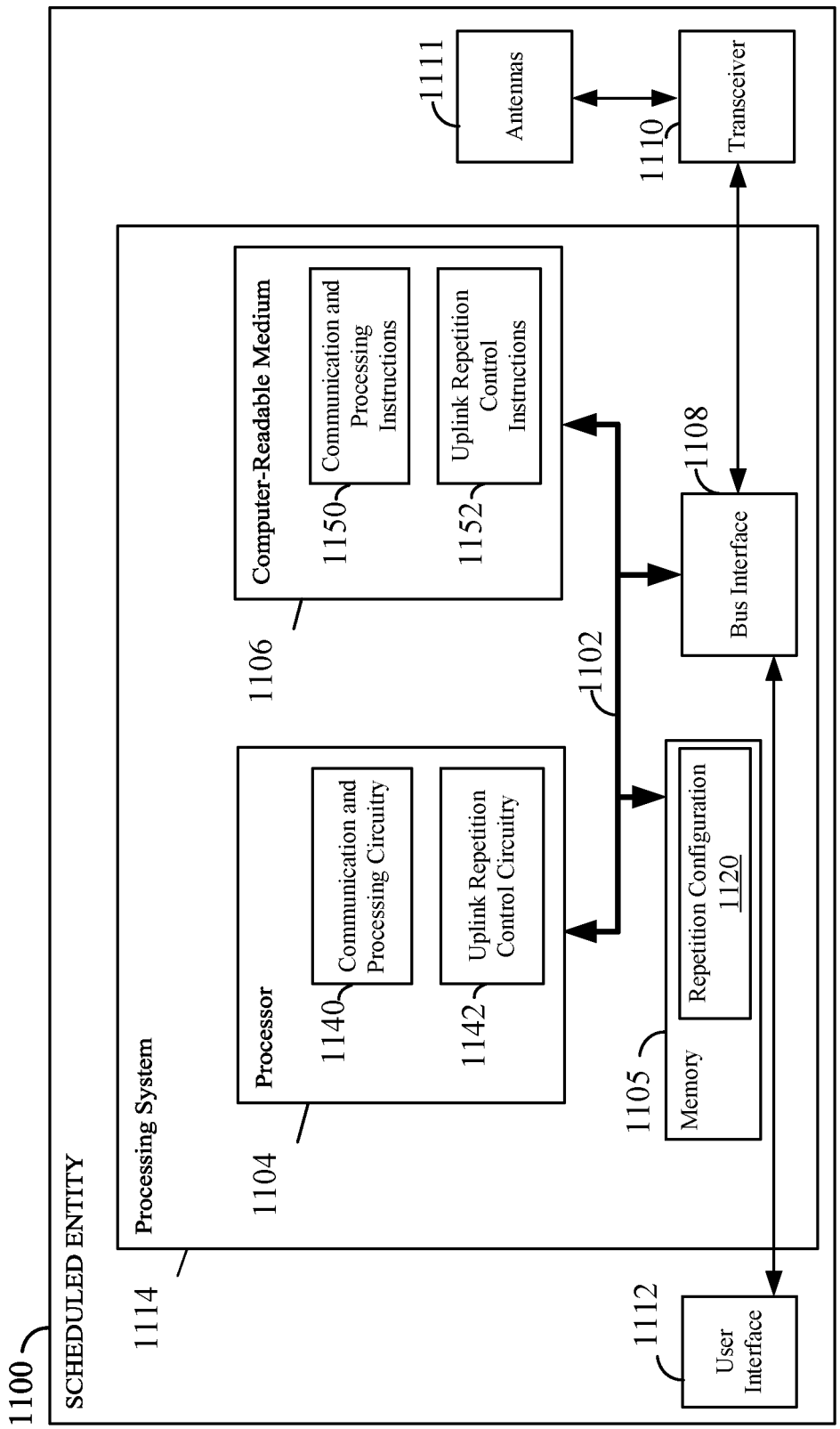
FIG. 11 is a block diagram illustrating an example of a hardware implementation for a scheduled entity according to some aspects.

FIG. 11 is a diagram illustrating an example of a hardware implementation for an exemplary scheduled entity 1100 employing a processing system 1114. In accordance with various aspects of the disclosure, an element, or any portion of an element, or any combination of elements may be implemented with a processing system 1114 that includes one or more processors 1104. For example, the scheduled entity 1100 may be a user equipment (UE) as illustrated in any one or more of FIGS. 1, 2, and/or 5.

The processing system 1114 may be substantially the same as the processing system 914 illustrated in FIG. 9, including a bus interface 1108, a bus 1102, memory 1105, a processor 1104, and a computer-readable medium 1106. Furthermore, the scheduled entity 1100 may include a user interface 1112 and a transceiver 1110 substantially similar to those described above in FIG. 8. For example, the transceiver 1110 can be connected to one or more antennas 1111 (e.g., active antennas) for receiving and transmitting wireless signals. That is, the processor 1104, as utilized in a scheduled entity 1100, may be used to implement any one or more of the processes described and illustrated in FIGS. 5-8, 12, and 13.

In some aspects of the disclosure, the processor 1104 may include circuitry configured for various functions, including, for example, uplink channel repetitions. For example, the circuitry may be configured to implement one or more of the functions described in relation to FIGS. 5-8, 12, and 13.

In some aspects of the disclosure, the processor 1104 may include communication and processing circuitry 1140 configured for various functions, including for example communicating with base stations (e.g., gNBs and scheduling entities). In some examples, the communication and processing circuitry 1140 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1140 may include one or more transmit/receive chains. In addition, the communication and processing circuitry 1140 may be configured to transmit and process uplink traffic and uplink control messages (e.g., similar to uplink traffic 116 and uplink control 118 of FIG. 1), receive and process downlink traffic and downlink control messages (e.g., similar to downlink traffic 112 and downlink control 114). The communication and processing circuitry 1140 may further be configured to execute communication and processing software 1150 stored on the computer-readable medium 1106 to implement one or more functions described herein.

In some implementations where the communication involves receiving information, the communication and processing circuitry 1140 may obtain information from a component of the apparatus 1100 (e.g., from the transceiver 1110 that receives the information via radio frequency signaling or some other type of signaling suitable for the applicable communication medium), process (e.g., decode) the information, and output the processed information. For example, the communication and processing circuitry 1140 may output the information to another component of the processor 1104, to the memory 1105, or to the bus interface 1108. In some examples, the communication and processing circuitry 1140 may receive one or more of signals, messages, other information, or any combination thereof. In some examples, the communication and processing circuitry 1140 may receive information via one or more channels. In some examples, the communication and processing circuitry 1140 may include functionality for a means for receiving. In some examples, the communication and processing circuitry 1140 may include functionality for a means for processing, including a means for demodulating, a means for decoding, etc.

In some implementations where the communication involves sending (e.g., transmitting) information, the communication and processing circuitry 1140 may obtain information (e.g., from another component of the processor 1104, the memory 1105, or the bus interface 1108), process (e.g., modulate, encode, etc.) the information, and output the processed information. For example, the communication and processing circuitry 1140 may output the information to the transceiver 1110 (e.g., that transmits the information via radio frequency signaling or some other type of signaling suitable for the applicable communication medium). In some examples, the communication and processing circuitry 1140 may send one or more of signals, messages, other information, or any combination thereof. In some examples, the communication and processing circuitry 1140 may send information via one or more channels. In some examples, the communication and processing circuitry 1140 may include functionality for a means for sending (e.g., a means for transmitting). In some examples, the communication and processing circuitry 1140 may include functionality for a means for generating, including a means for modulating, a means for encoding, etc.

In some aspects of the disclosure, the processor 1104 may include uplink repetition control circuitry 1142 configured for various functions, for example, controlling PUSCH/PUCCH repetitions in different network power modes. In one example, the uplink repetition control circuitry 1142 can be configured to adjust or change configured uplink channel repetitions in response to a change of network power modes or across different network power modes according to a repetition configuration 1120 stored in the memory 1105. In one example, the uplink repetition control circuitry 1142 can be configured to control the apparatus to transmit PUSCH/PUCCH repetitions until a power mode switching gap and stop repetitions after switching power modes. In one example, the uplink repetition control circuitry 1142 can be configured to control the apparatus to continue transmitting PUSCH/PUCCH repetitions after switching power modes as if there is no change in the power mode. In one example, the uplink repetition control circuitry 1142 can be configured to control the apparatus to transmit PUSCH/PUCCH repetitions using a network specific configuration based on the current network power mode. In one example, the uplink repetition control circuitry 1142 can be configured to control the PUSCH/PUCCH repetitions to maintain the same level of coverage across different network power modes. In one example, the uplink repetition control circuitry 1142 can be configured to send the maximum number of PUSCH/PUCCH repetitions configured across different network power modes. In one example, the uplink repetition control circuitry 1142 can be configured to keep the same number of PUSCH/PUCCH repetitions across different power modes. In one example, the uplink repetition control circuitry 1142 can be configured to increase or decrease the PUSCH/PUCCH repetitions after a change in network power mode. In one example, the uplink repetition control circuitry 1142 can be configured to control the RV of PUSCH/PUCCH repetitions across different network power modes. The uplink repetition control circuitry 1142 may further be configured to execute uplink repetition control software 1152 stored on the computer-readable medium 1106 to implement one or more functions described herein.

Figure 12:
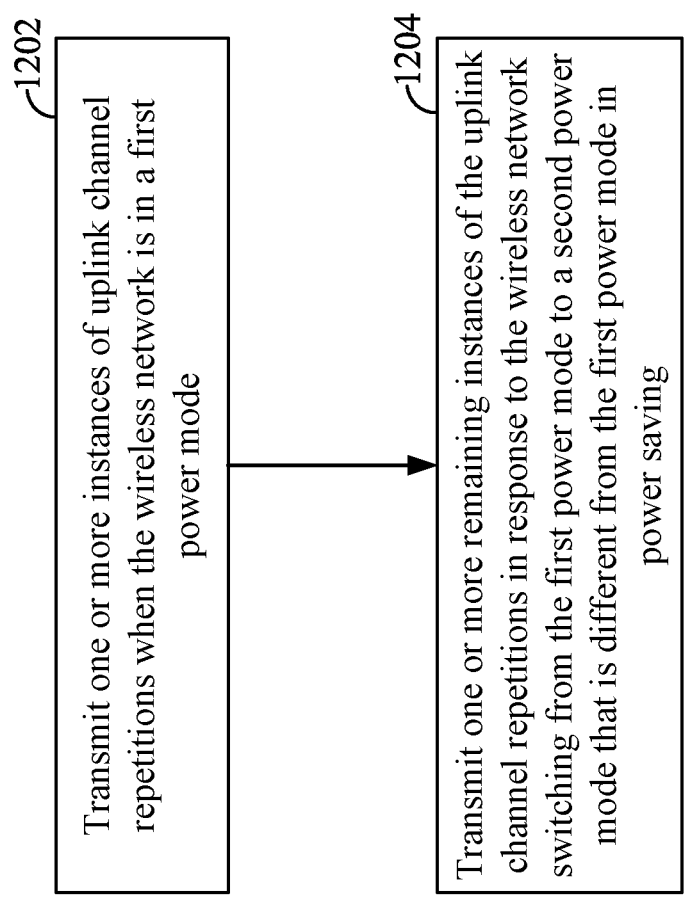
FIG. 12 is a flow chart illustrating an exemplary process for transmitting uplink channel repetitions across different network power modes according to some aspects.

FIG. 12 is a flow chart illustrating an exemplary process 1200 for uplink channel repetitions according to some aspects of the present disclosure. As described below, some or all illustrated features may be omitted in a particular implementation within the scope of the present disclosure, and some illustrated features may not be required for all implementations. In some examples, the process 1200 may be carried out by the scheduled entity 1100 (e.g., UE) illustrated in FIG. 11. In some examples, the process 1200 may be carried out by any suitable apparatus or means for carrying out the functions or algorithm described below.

At block 1202, a UE can transmit one or more instances of uplink channel repetitions in a wireless network when the wireless network is in a first power mode. For example, the uplink channel repetitions may include one or more instances of PUSCH and/or PUCCH repetitions. In one aspect, the communication and processing circuitry 1140 can provide a means to transmit the one or more instances of uplink channel repetitions using the transceiver 1110 and antennas 1111. In one aspect, the uplink repetition control circuitry 1142 can provide a means to determine the number of repetitions based on the current power mode of the network. For example, the repetitions can be RRC configured (e.g., repetition configuration 1120) by the network and saved in the memory 1105.

At block 1204, the UE can transmit one or more remaining instances of the uplink channel repetitions in response to the wireless network switching from the first power mode to a second power mode that is different from the first power mode in one or more aspects, for example, power saving. In one aspect, the communication and processing circuitry 1140 and transceiver 1110 can provide a means to transmit the one or more remaining instances of the uplink channel repetitions after the network power mode is switched. In one aspect, the uplink repetition control circuitry 1142 can provide a means to determine when the network mode is switched, for example, by using RRC, DCI, and/or MAC CE signaling with the network.

In some aspects, the UE can receive, from the wireless network (e.g., a base station, gNB, or scheduling entity), a downlink control message (e.g., DCI) indicating a first total number of instances of the uplink channel repetitions for the first power mode and a second total number of instances of the uplink channel repetitions for the second power mode. Thus, the UE can change the total number of instances of the uplink channel repetitions from the first total number to the second total number in response to the wireless communication network switching from the first power mode to the second power mode.

Figure 13:
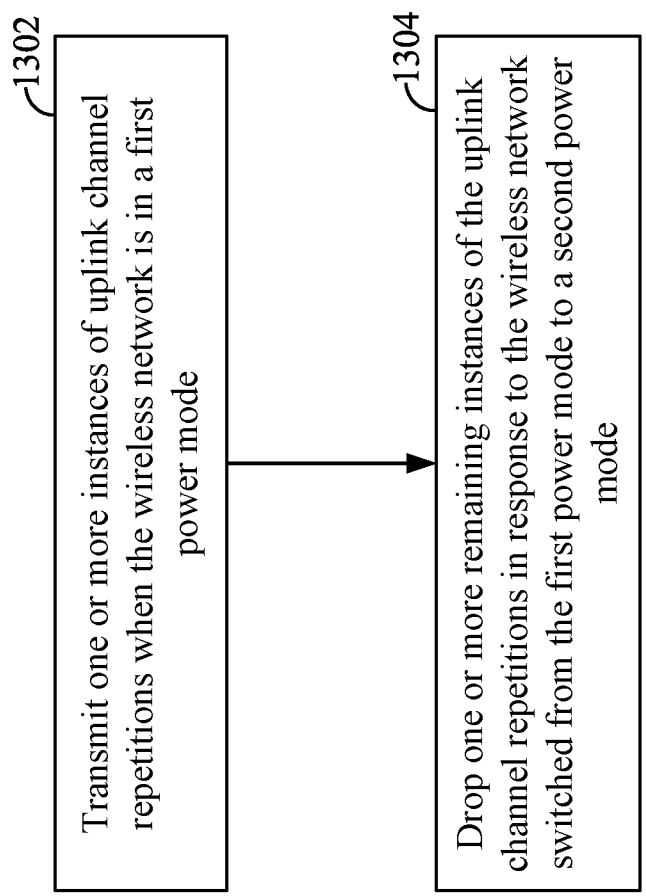
FIG. 13 is a flow chart illustrating another exemplary process for transmitting uplink channel repetitions across different network power modes according to some aspects.

FIG. 13 is a flow chart illustrating another exemplary process 1300 for uplink channel repetitions according to some aspects of the present disclosure. As described below, some or all illustrated features may be omitted in a particular implementation within the scope of the present disclosure, and some illustrated features may not be required for all implementations. In some examples, the process 1300 may be carried out by the scheduled entity 1100 (e.g., UE) illustrated in FIG. 11. In some examples, the process 1300 may be carried out by any suitable apparatus or means for carrying out the functions or algorithm described below.

At block 1302, a UE can transmit one or more instances of uplink channel repetitions in a wireless network when the wireless network is in a first power mode. In one example, the uplink channel repetitions may include one or more instances of PUSCH and/or PUCCH repetitions. In one aspect, the communication and processing circuitry 1140 can provide a means to transmit the one or more instances of uplink channel repetitions using the transceiver 1110 and one or more antennas 1111. In one aspect, the uplink repetition control circuitry 1142 can provide a means to determine the number of repetitions based on the current power mode (e.g., a nominal power mode or a power-saving mode) of the network and/or a repetition configuration 1120. For example, the repetitions can be RRC configured by the network.

At block 1304, the UE can drop one or more remaining instances of the uplink channel repetitions in response to the wireless network switching from the first power mode to a second power mode that is different from the first power mode in one or more aspects (e.g., power saving). In one aspect, the uplink repetition control circuitry 1142 can provide a means to drop or cancel the one or more remaining instances of the uplink channel repetitions in response to the network power mode switching. In one aspect, the uplink repetition control circuitry 1142 can provide a means to determine when the network mode is switched, for example, by using RRC, DCI, and/or MAC CE signaling with the network (e.g., a base station or gNB).

In one configuration, the apparatus 1100 for wireless communication includes means for controlling uplink channel repetitions as described herein. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1,2, and/or 5, and utilizing, for example, the processes and/or algorithms described herein in relation to FIGS. 5-8, 12, and/or 13.

A first aspect of the disclosure provides an apparatus for wireless communication, comprising: a transceiver for wireless communication; a memory; and a processor coupled to the transceiver and the memory, the processor and the memory are configured to: transmit, to a wireless network, one or more instances of uplink channel repetitions when the wireless network is in a first power mode; and transmit one or more remaining instances of the uplink channel repetitions in response to the wireless network switching from the first power mode to a second power mode that is different from the first power mode.

In a second aspect, alone or in combination with the first aspect, wherein the processor and the memory are further configured to: transmit the one or more instances of the uplink channel repetitions using a first repetition configuration based on the first power mode; and transmit the one or more remaining instances of the uplink channel repetitions using a second repetition configuration based on the second power mode.

In a third aspect, alone or in combination with the second aspect, wherein the first repetition configuration and the second repetition configuration are different in terms of at least one of: a number of antennas; or a transmit power.

In a fourth aspect, alone or in combination with any of the first to third aspects, wherein the processor and the memory are further configured to: change a total number of instances of the uplink channel repetitions in response to the wireless network switching from the first power mode to the second power mode.

In a fifth aspect, alone or in combination with the fourth aspect, wherein the processor and the memory are further configured to maintain a coverage of the uplink channel repetitions by changing the total number of instances of the uplink channel repetitions in response to the wireless network switching from the first power mode to the second power mode.

In a sixth aspect, alone or in combination with the fourth aspect, wherein the processor and the memory are further configured to: receive, from the wireless network, a downlink control message indicating a first total number of instances of the uplink channel repetitions for the first power mode and a second total number of instances of the uplink channel repetitions for the second power mode; and change the total number of instances of the uplink channel repetitions from the first total number to the second total number in response to the wireless network switching from the first power mode to the second power mode.

In a seventh aspect, alone or in combination with any of the first to third aspects, wherein the processor and the memory are further configured to: change a respective redundancy version of at least one remaining instance of the one or more remaining instances of the uplink channel repetitions in response to the wireless network switching from the first power mode to the second power mode.

In an eighth aspect, alone or in combination with any of the first to third aspects, wherein the first power mode and the second power mode are different in terms of at least one of: a sleep mode configuration; a transmission power configuration; a radio access technology configuration; or an antenna array configuration.

In a ninth aspect, alone or in combination with any of the first to third aspects, wherein the processor and the memory are further configured to: transmit the one or more instances of the uplink channel repetitions using a first redundancy version (RV); transmit a first instance of the one or more remaining instances of the uplink channel repetitions using the first RV after switching from the first power mode to the second power mode; and transmit a second instance of the one or more remaining instances of the uplink channel repetitions using a second RV that is different from the first RV.

In a tenth aspect, alone or in combination with the first aspect, wherein the processor and the memory are further configured to: transmit the one or more instances of the uplink channel repetitions until a switching gap between the first power mode and the second power mode; and transmit the one or more remaining instances of the uplink channel repetitions after the switching gap irrespective of the wireless network switching from the first power mode to the second power mode.

An eleventh aspect of the disclosure provides an apparatus for wireless communication, comprising: a transceiver configured for wireless communication; a memory; and a processor coupled to the transceiver and the memory, the processor and the memory are configured to: transmit, to a wireless network, one or more instances of uplink channel repetitions when the wireless network is in a first power mode; and drop one or more remaining instances of the uplink channel repetitions in response to the wireless network switching from the first power mode to a second power mode that is different from the first power mode.

In a twelfth aspect, alone or in combination with the eleventh aspect, wherein the first power mode and the second power mode are different in terms of at least one of: a sleep mode configuration; a transmission power configuration; a radio access technology configuration; or an antenna array configuration.

A thirteenth aspect of the disclosure provides a method of wireless communication at a user equipment (UE), comprising: transmitting, to a wireless network, one or more instances of uplink channel repetitions when the wireless network is in a first power mode; and transmitting one or more remaining instances of the uplink channel repetitions in response to the wireless network switching from the first power mode to a second power mode that is different from the first power mode.

In a fourteenth aspect, alone or in combination with the thirteenth aspect, the method further comprises: transmitting the one or more instances of the uplink channel repetitions using a first repetition configuration based on the first power mode; and transmitting the one or more remaining instances of the uplink channel repetitions using a second repetition configuration based on the second power mode.

In a fifteenth aspect, alone or in combination with the fourteenth aspect, wherein the first repetition configuration and the second repetition configuration are different in terms of at least one of: a number of antennas; or a transmit power.

In a sixteenth aspect, alone or in combination with any of the thirteenth to fifteenth aspects, the method further comprises: changing a total number of instances of the uplink channel repetitions in response to the wireless network switching from the first power mode to the second power mode.

In a seventeenth aspect, alone or in combination with the sixteenth aspect, the method further includes maintaining a coverage of the uplink channel repetitions by changing the total number of instances of the uplink channel repetitions in response to the wireless network switching from the first power mode to the second power mode.

In an eighteenth aspect, alone or in combination with the sixteenth aspect, the method further comprises: receiving, from the wireless network, a downlink control message indicating a first total number of instances of the uplink channel repetitions for the first power mode and a second total number of instances of the uplink channel repetitions for the second power mode; and changing the total number of instances of the uplink channel repetitions from the first total number to the second total number in response to the wireless network switching from the first power mode to the second power mode.

In a nineteenth aspect, alone or in combination with any of the thirteenth to fifteenth aspects, the method further comprises changing a respective redundancy version of at least one remaining instance of the one or more remaining instances of the uplink channel repetitions in response to the wireless network switching from the first power mode to the second power mode.

In a twentieth aspect, alone or in combination with any of the thirteenth to fifteenth aspects, wherein the first power mode and the second power mode are different in terms of at least one of: a sleep mode configuration; a transmission power configuration; a radio access technology configuration; or an antenna array configuration.

In a twenty-first aspect, alone or in combination with any of the thirteenth to fifteenth aspects, the method further comprises: transmitting the one or more instances of the uplink channel repetitions using a first redundancy version (RV); transmitting a first instance of the one or more remaining instances of the uplink channel repetitions using the first RV after switching from the first power mode to the second power mode; and transmitting a second instance of the one or more remaining instances of the uplink channel repetitions using a second RV that is different from the first RV.

In a twenty-second aspect, alone or in combination with the thirteenth aspect, the method further comprises: transmitting the one or more instances of the uplink channel repetitions until a switching gap between the first power mode and the second power mode; and transmitting the one or more remaining instances of the uplink channel repetitions after the switching gap irrespective of the wireless network switching from the first power mode to the second power mode.

A twenty-third aspect of the disclosure provides an apparatus for wireless communication, comprising: a transceiver for wireless communication; a memory; and a processor coupled to the transceiver and the memory, wherein the processor and the memory are configured to: receive, from a user equipment (UE), one or more instances of uplink channel repetitions when the apparatus is in a first power mode; switch from the first power mode to a second power mode that is different from the first power mode; and receive, from the UE, one or more remaining instances of the uplink channel repetitions after switching from the first power mode to the second power mode.

In a twenty-fourth aspect, alone or in combination with the twenty-third aspect, wherein the processor and the memory are further configured to: receive the one or more instances of the uplink channel repetitions using a first repetition configuration based on the first power mode; and receive the one or more remaining instances of the uplink channel repetitions using a second repetition configuration based on the second power mode.

In a twenty-fifth aspect, alone or in combination with the twenty-fourth aspect, wherein the first repetition configuration and the second repetition configuration are different in terms of at least one of: a number of antennas; or a transmit power.

In a twenty-sixth aspect, alone or in combination with any of the twenty-third to twenty-fifth aspects, wherein the one or more instances of the uplink channel repetitions are received at a first power, and the one or more remaining instances of the uplink channel repetitions are received at a second power different than the first power.

In a twenty-seventh aspect, alone or in combination with any of the twenty-third to twenty-fifth aspects, wherein the first power mode and the second power mode are different in terms of at least one of: a sleep mode configuration; a transmission power configuration; a radio access technology configuration; or an antenna array configuration.

In a twenty-eighth aspect, alone or in combination with any of the twenty-third to twenty-fifth aspects, wherein the processor and the memory are further configured to: transmit, to the UE, a message indicating a total number of instances of the uplink channel repetitions to maintain a same level of coverage of the uplink channel repetitions across the first power mode and the second power mode.

In a twenty-ninth aspect, alone or in combination with any of the twenty-third to twenty-fifth aspects, wherein the processor and the memory are further configured to: receive the one or more instances of the uplink channel repetitions using a first redundancy version (RV); and receive the one or more remaining instances of the uplink channel repetitions using a second RV that is different from the first RV.

In a thirtieth aspect, alone or in combination with any of the twenty-third to twenty-fifth aspects, wherein the processor and the memory are further configured to: receive the one or more instances of the uplink channel repetitions using a first redundancy version (RV); receive a first instance of the one or more remaining instances of the uplink channel repetitions using the first RV after switching from the first power mode to the second power mode; and receive a second instance of the one or more remaining instances of the uplink channel repetitions using a second RV that is different from the first RV.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:
1. An apparatus for wireless communication, comprising:
one or more memories; and
one or more processors coupled to the one or more memories, wherein the one or more processors are configured to:

transmit, to a wireless network, one or more instances of uplink channel repetitions when the wireless network is in a first power mode; and
transmit one or more remaining instances of the uplink channel repetitions in response to the wireless network switching from the first power mode to a second power mode that is different from the first power mode, wherein the first power mode and the second power mode are configured to control power consumption of the wireless network;
wherein a combination of the one or more instances and the one or more remaining instances is equal to a maximum of a first total number of instances of the uplink channel repetitions configured in the first power mode and a second total number of instances of the uplink channel repetitions configured in the second power mode, wherein the first total number of instances is different than the second total number of instances.

2. The apparatus of claim 1, wherein the one or more processors are further configured to:
transmit the one or more instances of the uplink channel repetitions using a first repetition configuration based on the first power mode; and
transmit the one or more remaining instances of the uplink channel repetitions using a second repetition configuration based on the second power mode.

3. The apparatus of claim 2, wherein the first repetition configuration and the second repetition configuration are different in terms of at least one of:
a number of antennas; or
a transmit power.

4. The apparatus of claim 1, wherein the one or more processors are further configured to:
change a total number of instances of the uplink channel repetitions in response to the wireless network switching from the first power mode to the second power mode.

5. The apparatus of claim 4, wherein the one or more processors are further configured to:
maintain a coverage of the uplink channel repetitions by changing the total number of instances of the uplink channel repetitions in response to the wireless network switching from the first power mode to the second power mode.

6. The apparatus of claim 4, wherein the one or more processors are further configured to:
receive, from the wireless network, a downlink control message indicating the first total number of instances of the uplink channel repetitions for the first power mode and the second total number of instances of the uplink channel repetitions for the second power mode; and
change the total number of instances of the uplink channel repetitions from the first total number to the second total number in response to the wireless network switching from the first power mode to the second power mode.

7. The apparatus of claim 1, wherein the one or more processors are further configured to:
change a respective redundancy version of at least one remaining instance of the one or more remaining instances of the uplink channel repetitions in response to the wireless network switching from the first power mode to the second power mode.

8. The apparatus of claim 1, wherein the first power mode and the second power mode are different in terms of at least one of:

a sleep mode configuration;
a transmission power configuration;
a radio access technology configuration; or
an antenna array configuration.

9. The apparatus of claim 1, wherein the one or more processors are further configured to:
transmit the one or more instances of the uplink channel repetitions using a first redundancy version (RV);
transmit a first instance of the one or more remaining instances of the uplink channel repetitions using the first RV after switching from the first power mode to the second power mode; and
transmit a second instance of the one or more remaining instances of the uplink channel repetitions using a second RV that is different from the first RV.

10. The apparatus of claim 1, wherein the one or more processors are further configured to:
transmit the one or more instances of the uplink channel repetitions until a switching gap between the first power mode and the second power mode; and
transmit the one or more remaining instances of the uplink channel repetitions after the switching gap.

11. A method of wireless communication at a user equipment (UE), comprising:
transmitting, to a wireless network, one or more instances of uplink channel repetitions when the wireless network is in a first power mode; and
transmitting one or more remaining instances of the uplink channel repetitions in response to the wireless network switching from the first power mode to a second power mode that is different from the first power mode, wherein the first power mode and the second power mode are configured to control power consumption of the wireless network;
wherein a combination of the one or more instances and the one or more remaining instances is equal to a maximum of a first total number of instances of the uplink channel repetitions configured in the first power mode and a second total number of instances of the uplink channel repetitions configured in the second power mode, wherein the first total number of instances is different than the second total number of instances.

12. The method of claim 11, further comprising:
transmitting the one or more instances of the uplink channel repetitions using a first repetition configuration based on the first power mode; and
transmitting the one or more remaining instances of the uplink channel repetitions using a second repetition configuration based on the second power mode.

13. The method of claim 12, wherein the first repetition configuration and the second repetition configuration are different in terms of at least one of:
a number of antennas; or
a transmit power.

14. The method of claim 11, further comprising:
changing a total number of instances of the uplink channel repetitions in response to the wireless network switching from the first power mode to the second power mode.

15. The method of claim 14, further comprising:
maintaining a coverage of the uplink channel repetitions by changing the total number of instances of the uplink channel repetitions in response to the wireless network switching from the first power mode to the second power mode.

16. The method of claim 14, further comprising:
receiving, from the wireless network, a downlink control message indicating the first total number of instances of the uplink channel repetitions for the first power mode and the second total number of instances of the uplink channel repetitions for the second power mode; and
changing the total number of instances of the uplink channel repetitions from the first total number to the second total number in response to the wireless network switching from the first power mode to the second power mode.

17. The method of claim 11, further comprising:
changing a respective redundancy version of at least one remaining instance of the one or more remaining instances of the uplink channel repetitions in response to the wireless network switching from the first power mode to the second power mode.

18. The method of claim 11, wherein the first power mode and the second power mode are different in terms of at least one of:
a sleep mode configuration;
a transmission power configuration;
a radio access technology configuration; or
an antenna array configuration.

19. The method of claim 11, further comprising:
transmitting the one or more instances of the uplink channel repetitions using a first redundancy version (RV);
transmitting a first instance of the one or more remaining instances of the uplink channel repetitions using the first RV after switching from the first power mode to the second power mode; and
transmitting a second instance of the one or more remaining instances of the uplink channel repetitions using a second RV that is different from the first RV.

20. The method of claim 11, further comprising:
transmitting the one or more instances of the uplink channel repetitions until a switching gap between the first power mode and the second power mode; and
transmitting the one or more remaining instances of the uplink channel repetitions after the switching gap irrespective of the wireless network switching from the first power mode to the second power mode.

21. An apparatus for wireless communication, comprising:
one or more memories; and
one or more processors coupled to the one or more, wherein the one or more processors are configured to:
receive, from a user equipment (UE), one or more instances of uplink channel repetitions when the apparatus is in a first power mode;
switch from the first power mode to a second power mode that is different from the first power mode, wherein the first power mode and the second power mode are configured to control power consumption of the apparatus; and
receive, from the UE, one or more remaining instances of the uplink channel repetitions after switching from the first power mode to the second power mode;
wherein a combination of the one or more instances and the one or more remaining instances is equal to a maximum of a first total number of instances of the uplink channel repetitions configured in the first power mode and a second total number of instances of the uplink channel repetitions configured in the second power mode, wherein the first total number of instances is different than the second total number of instances.

22. The apparatus of claim 21, wherein the one or more processors are further configured to:
receive the one or more instances of the uplink channel repetitions using a first repetition configuration based on the first power mode; and
receive the one or more remaining instances of the uplink channel repetitions using a second repetition configuration based on the second power mode.

23. The apparatus of claim 22, wherein the first repetition configuration and the second repetition configuration are different in terms of at least one of:
a number of antennas; or
a transmit power.

24. The apparatus of claim 21, wherein the one or more instances of the uplink channel repetitions are received at a first power, and the one or more remaining instances of the uplink channel repetitions are received at a second power different than the first power.

25. The apparatus of claim 21, wherein the first power mode and the second power mode are different in terms of at least one of:
a sleep mode configuration;
a transmission power configuration;
a radio access technology configuration; or
an antenna array configuration.

26. The apparatus of claim 21, wherein the one or more processors are further configured to:
transmit, to the UE, a message indicating a total number of instances of the uplink channel repetitions to maintain a same level of coverage of the uplink channel repetitions across the first power mode and the second power mode.

27. The apparatus of claim 21, wherein the one or more processors are further configured to:
receive the one or more instances of the uplink channel repetitions using a first redundancy version (RV); and
receive the one or more remaining instances of the uplink channel repetitions using a second RV that is different from the first RV.

28. The apparatus of claim 21, wherein the one or more processors are further configured to:
receive the one or more instances of the uplink channel repetitions using a first redundancy version (RV);
receive a first instance of the one or more remaining instances of the uplink channel repetitions using the first RV after switching from the first power mode to the second power mode; and
receive a second instance of the one or more remaining instances of the uplink channel repetitions using a second RV that is different from the first RV.

29. A method of wireless communication at a network entity, comprising:
receiving, from a user equipment (UE), one or more instances of uplink channel repetitions when the apparatus is in a first power mode;
switching from the first power mode to a second power mode that is different from the first power mode, wherein the first power mode and the second power mode are configured to control power consumption of the apparatus; and
receiving, from the UE, one or more remaining instances of the uplink channel repetitions after switching from the first power mode to the second power mode;

wherein a combination of the one or more instances and the one or more remaining instances is equal to a maximum of a first total number of instances of the uplink channel repetitions configured in the first power mode and a second total number of instances of the uplink channel repetitions configured in the second power mode, wherein the first total number of instances is different than the second total number of instances.

30. The method of claim 29, further comprising:

receiving the one or more instances of the uplink channel repetitions using a first repetition configuration based on the first power mode; and receiving the one or more remaining instances of the uplink channel repetitions using a second repetition configuration based on the second power mode.

* * * * *